(12) United States Patent
Ito

(10) Patent No.: US 12,382,167 B2
(45) Date of Patent: *Aug. 5, 2025

(54) CONTROL APPARATUS, CONTROL METHOD, IMAGE CAPTURING APPARATUS, AND IMAGE CAPTURING SYSTEM

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 296 days.

This patent is subject to a terminal disclaimer.

(21) Appl. No.: 18/160,368

(22) Filed: Jan. 27, 2023

(65) Prior Publication Data

US 2023/0171489 A1     Jun. 1, 2023

Related U.S. Application Data

(63) Continuation of application No. 17/123,020, filed on Dec. 15, 2020, now Pat. No. 11,595,571.

(30) Foreign Application Priority Data

Dec. 18, 2019     (JP) .................... 2019-228616

(51) Int. Cl.
   *H04N 23/66*     (2023.01)
   *H04N 23/60*     (2023.01)
   *H04N 23/63*     (2023.01)

(52) U.S. Cl.
   CPC .......... *H04N 23/665* (2023.01); *H04N 23/63* (2023.01)

(58) Field of Classification Search
   CPC ..................... H04N 23/665; H04N 23/63
   See application file for complete search history.

(56) References Cited

U.S. PATENT DOCUMENTS

| | | | |
|---|---|---|---|
| 11,595,571 B2 * | 2/2023 | Ito | H04N 23/63 |
| 2007/0211153 A1 | 9/2007 | Uchida et al. | |

(Continued)

FOREIGN PATENT DOCUMENTS

| | | |
|---|---|---|
| CN | 104302225 A | 1/2015 |
| CN | 106664357 A | 5/2017 |

(Continued)

OTHER PUBLICATIONS

The above Foreign Patent Document was cited in an Oct. 6, 2023 Japanese Office Action, enclosed without an English Translation, that issued in Japanese Patent Application No. 2019-228616.

(Continued)

*Primary Examiner* — Lin Ye
*Assistant Examiner* — Fayez A Bhuiyan
(74) *Attorney, Agent, or Firm* — Cowan, Liebowitz & Latman, P.C.

(57) ABSTRACT

A control apparatus comprises a generation unit that generates a first synchronization signal and a second synchronization signal; and a control unit that controls the generation unit. The control unit controls the generation unit such that the first synchronization signal used to repeatedly readout a first image signal to be sequentially displayed on a display and the second synchronization signal used to display the first image signal on the display are output with a predetermined time difference. In a case where a second image signal is read out at a timing corresponding to a shooting instruction between readouts of the first image signals, the first and second synchronization signals are output with the predetermined time difference before and after the readouts of the second image signal.

16 Claims, 9 Drawing Sheets

(56) References Cited

U.S. PATENT DOCUMENTS

2015/0138328 A1 5/2015 Yokohama
2020/0358950 A1 11/2020 Tanaka et al.

FOREIGN PATENT DOCUMENTS

| CN | 110463187 A | 11/2019 |
| JP | 2004-104639 A | 4/2004 |
| JP | 2007-243615 A | 9/2007 |
| JP | 2009159067 A | 7/2009 |
| JP | 2012-070306 A | 4/2012 |

OTHER PUBLICATIONS

The above U.S. Publication No. #3 and Foreign Publication Nos. #2-6 were cited in a Dec. 28, 2022 Chinese Office Action, enclosed with an English Translation, that issued in Chinese Patent Application No. 202011503816.8.

* cited by examiner

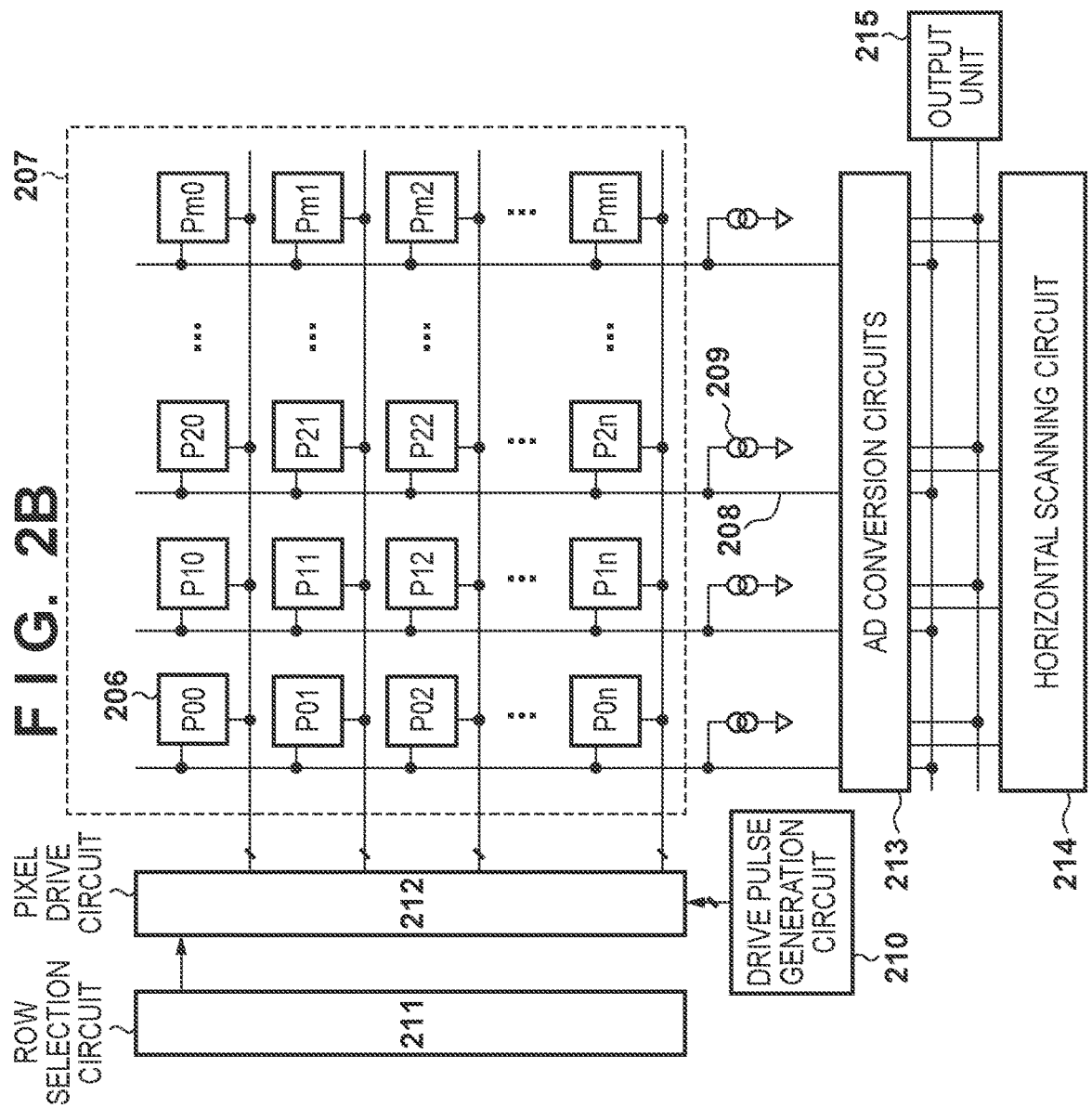
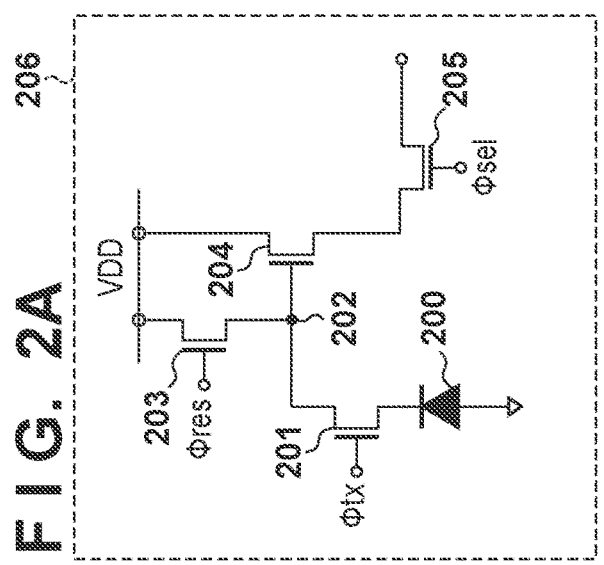

CONTROL APPARATUS, CONTROL METHOD, IMAGE CAPTURING APPARATUS, AND IMAGE CAPTURING SYSTEM

CROSS-REFERENCE TO RELATED APPLICATIONS

This application is a continuation of application Ser. No. 17/123,020, filed Dec. 15, 2020, the entire disclosure of which is hereby incorporated by reference.

BACKGROUND OF THE INVENTION

Field of the Invention

The present invention relates to a control apparatus, a control method, an image capturing apparatus, and an image capturing system and more specifically to a technique for controlling image shooting timings of images and display timings of the shot images.

Description of the Related Art

Some digital cameras and electronic devices having a camera function (hereinafter collectively referred to as "image capturing apparatus") have a live view (LV) function. The LV function is a function of shooting a moving image and displaying the obtained image (hereinafter, referred to as "LV image") on a display in parallel. By using the displayed LV image as a finder, a user can find a desired composition in still image shooting or moving image shooting while checking the LV image. Hereinafter, the operation for adjusting shooting conditions, such as changing zoom ratio, panning, tilting, and so forth, for finding a desired composition is referred to as "framing".

Operability for framing is important for a user to shoot an image as he/she intends. For example, if the time lag (display time lag) from the shooting of an LV image to the display of the LV image on the display is long, a phenomenon that a subject has already moved to somewhere at the timing when the image of the subject is displayed on the display may occur. Thus, the display time lag greatly affects the operability for framing.

In an image capturing apparatus that captures a still image by performing framing using the LV function, the framing cannot be performed unless the LV image is continuously displayed on the display even during continuous shooting of still images. However, in a case where shooting and displaying of the LV image are performed between frames of still images during continuous shooting of still images, it is difficult to adjust the timing of capturing each frame of the LV image if the interval of the continuous shooting of still images is short. As a result, during the continuous shooting of still images, a period from the timing of capturing each frame of the LV image to the timing of updating the LV image on the display becomes long, a display time lag increases, and the framing becomes difficult.

To solve this problem, Japanese Patent Laid-Open No. 2007-243615 discloses a method of reducing a display time lag by synchronously controlling the image shooting timing of the image sensor and the display start timing of the display with a predetermined time difference.

However, in the conventional technique disclosed in Japanese Patent Laid-Open No. 2007-243615, the LV image becomes unnatural when the image shooting operation of the LV image is not performed at regular intervals. For example, when a still image is shot between frames of the LV image shot at a constant cycle, the display cycle cannot be kept at a constant cycle at the timing of shooting the still image. As a result, a user may feel that the motion of the subject in the LV image is different from the actual motion of the subject. Further, if shot images are processed through different processing routes and so the display time lag until respective images are displayed on the display fluctuates, the timing at which the subject moves in the LV image and the timing at which the subject actually moves differ. In these cases, it becomes difficult to perform the framing by viewing the LV image.

SUMMARY OF THE INVENTION

The present invention has been made in consideration of the above situation, and performs live view display with a short display time lag even during continuous shooting of still images, thereby improving operability for framing.

According to the present invention, provided is a control apparatus comprising: a generation unit that generates a first synchronization signal for controlling readout timing of an image signal from an image sensor and a second synchronization signal for controlling timing for displaying the readout image signal on a display; and a control unit that controls the generation unit, wherein the control unit controls the generation unit such that the first synchronization signal used to repeatedly readout a first image signal to be sequentially displayed on the display and the second synchronization signal used to display the first image signal on the display are output with a predetermined time difference, and in a case where a second image signal is read out at a timing corresponding to a shooting instruction between readouts of the first image signals, the first synchronization signal and the second synchronization signal are output with the predetermined time difference before and after the readouts of the second image signal, and wherein each unit is implemented by one or more processors, circuitry or a combination thereof.

Further, according to the present invention, provided is an image capturing apparatus including: an image sensor, and a control apparatus comprising: a generation unit that generates a first synchronization signal for controlling readout timing of an image signal from the image sensor and a second synchronization signal for controlling timing for displaying the readout image signal on a display; and a control unit that controls the generation unit, wherein the control unit controls the generation unit such that the first synchronization signal used to repeatedly readout a first image signal to be sequentially displayed on the display and the second synchronization signal used to display the first image signal on the display are output with a predetermined time difference, and in a case where a second image signal is read out at a timing corresponding to a shooting instruction between readouts of the first image signals, the first synchronization signal and the second synchronization signal are output with the predetermined time difference before and after the readouts of the second image signal, and wherein each unit is implemented by one or more processors, circuitry or a combination thereof.

Furthermore, according to the present invention, provided is an image capturing system comprising: an image capturing apparatus including: an image sensor, and a control apparatus comprising: a generation unit that generates a first synchronization signal for controlling readout timing of an image signal from the image sensor and a second synchronization signal for controlling timing for displaying the readout image signal on a display; and a control unit that controls the generation unit, and a processing apparatus, connected to the control apparatus, including a processing unit that processes the image signal output from the image sensor by taking synchronization with the control apparatus, wherein the control unit controls the generation unit such that the first synchronization signal used to repeatedly readout a first image signal to be sequentially displayed on the display and the second synchronization signal used to display the first image signal on the display are output with a predetermined time difference, and in a case where a second image signal is read out at a timing corresponding to a shooting instruction between readouts of the first image signals, the first synchronization signal and the second synchronization signal are output with the predetermined time difference before and after the readouts of the second image signal, and wherein each unit is implemented by one or more processors, circuitry or a combination thereof.

Further, according to the present invention, provided is an image capturing system comprising: an image capturing apparatus including: an image sensor, and a control apparatus comprising: a generation unit that generates a first synchronization signal for controlling readout timing of an image signal from the image sensor and a second synchronization signal for controlling timing for displaying the readout image signal on a display; and a control unit that controls the generation unit, and a processing apparatus, connected to the control apparatus, including a processing unit that processes the image signal output from the image sensor without taking synchronization with the control apparatus, wherein the control unit controls the generation unit such that the first synchronization signal used to repeatedly readout a first image signal to be sequentially displayed on the display and the second synchronization signal used to display the first image signal on the display are output with a predetermined time difference, and in a case where a second image signal is read out at a timing corresponding to a shooting instruction between readouts of the first image signals, the first synchronization signal and the second synchronization signal are output with the predetermined time difference before and after the readouts of the second image signal, and wherein each unit is implemented by one or more processors, circuitry or a combination thereof.

Further, according to the present invention, provided is a control method comprising: generating a first synchronization signal used to repeatedly readout from an image sensor a first image signal to be sequentially displayed on a display and a second synchronization signal used to display the first image signal on the display, and outputting the first synchronization signal and the second synchronization signal with a predetermined time difference, and in a case where a second image signal is read out from the image sensor at a timing corresponding to a shooting instruction between readouts of the first image signals, outputting the first synchronization signal and the second synchronization signal with the predetermined time difference after the readouts of the second image signal.

Further, according to the present invention, provided is a non-transitory computer-readable storage medium, the storage medium storing a program that is executable by the computer, wherein the program includes program code for causing the computer to function as a control processing apparatus comprising: a generation unit that generates a first synchronization signal for controlling readout timing of an image signal from an image sensor and a second synchronization signal for controlling timing for displaying the readout image signal on a display; and a control unit that controls the generation unit, wherein the control unit controls the generation unit such that the first synchronization signal used to repeatedly readout a first image signal to be sequentially displayed on the display and the second synchronization signal used to display the first image signal on the display are output with a predetermined time difference, and in a case where a second image signal is read out at a timing corresponding to a shooting instruction between readouts of the first image signals, the first synchronization signal and the second synchronization signal are output with the predetermined time difference before and after the readouts of the second image signal.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2A is a circuit diagram of a pixel according to the embodiments;

FIG. 2B is a block diagram of an image sensor according to the embodiments;

DESCRIPTION OF THE EMBODIMENTS

Figure 1:
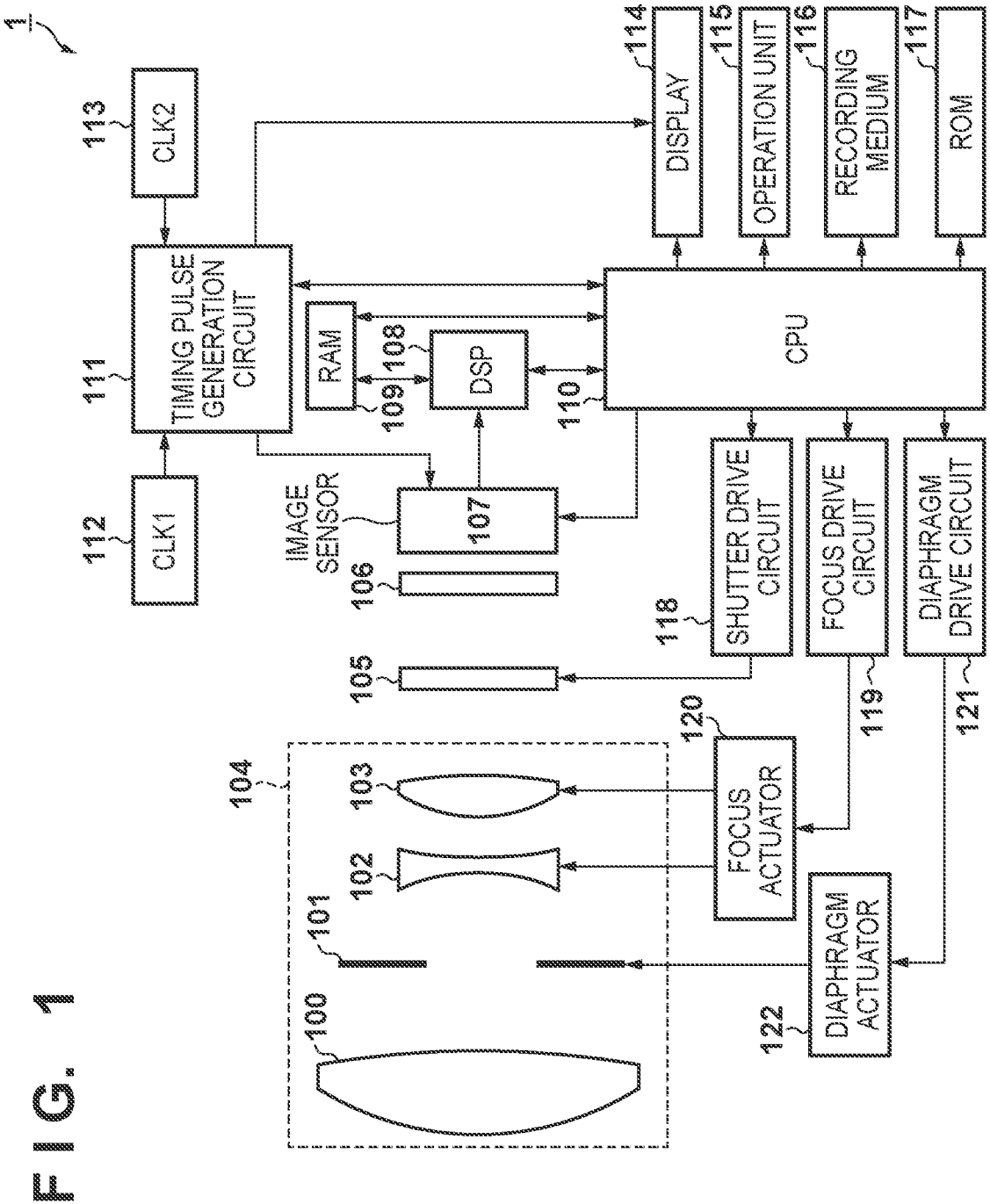
FIG. 1 is a block diagram showing a configuration of an image capturing apparatus according to embodiments of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing the configuration of an image capturing apparatus 1 according to a first embodiment of the present invention. In FIG. 1, a first lens 100 is arranged at the tip of an imaging optical system 104. Aperture diameter of a diaphragm 101 is adjusted to control the light amount at the time of shooting. A second lens 102 and a third lens 103 are driven by a focus actuator 120 and move back and forth in the optical axis direction to adjust the focal point of the imaging optical system 104.

A focal plane shutter 105 has a function of adjusting the exposure period at the time of shooting a still image. However, in a case where the electronic shutter is used for adjusting the exposure period in the slit-rolling reading, the focal plane shutter 105 is not used for adjusting the exposure period. An optical low-pass filter 106 is used to reduce false color and moiré in a captured image.

An image sensor 107 photoelectrically converts an optical image of a subject formed by the imaging optical system 104 into an electric signal (image signal). Further, the image sensor 107 has an electronic shutter function and can acquire an image signal by the slit-rolling reading.

A digital signal processor (DSP) 108 receives the image signal from the image sensor 107 and performs image processing on it. In addition to the image processing, the DSP 108 calculates information to be used for driving focus lenses (second lens 102, third lens 103) based on information from the image sensor 107.

A random access memory (RAM) 109 has both a function of storing image data processed by the DSP 108 and a function as a work memory when a central processing unit (CPU) 110 operates. Although the present embodiment is configured to realize these functions using the RAM 109, other types of memory may be used as long as the access speed is sufficiently high and there is no problem in operation. Further, in the present embodiment, the RAM 109 is arranged outside the DSP 108 and the CPU 110, but a part or all of the functions thereof may be built in the DSP 108 or the CPU 110.

The CPU 110 executes a program for controlling each part of the image capturing apparatus 1, and controls the overall operation of the image capturing apparatus 1. The CPU 110 can control reading of image signals from the image sensor 107 by performing various settings on the image sensor 107. Further, the CPU 110 communicates with a timing pulse generation circuit 111 and controls the generation timing of various timing pulses for controlling the operation of each module as described later.

The timing pulse generation circuit 111 generates a plurality of synchronization signals based on a clock signal CLK1 from a first clock 112 and a clock signal CLK2 from a second clock 113, and supplies them to the image sensor 107 and a display 114. The image sensor 107 performs a shooting operation in synchronization with the signals from the timing pulse generation circuit 111.

Further, the display 114 operates in synchronization with the signals from the timing pulse generation circuit 111 to update a displayed image. Further, the CPU 110 also has a function of controlling the focus actuator 120 to adjust the focal point of the imaging optical system 104 using the calculation result output from the DSP 108.

The display 114 displays a still image and a moving image which are processed by the DSP 108, a menu, and so on. By sequentially displaying frames of a moving image (LV image) on the display 114 and using the display 114 as a finder, the user can perform framing while confirming the composition in still image shooting and moving image shooting. The display 114 may include a plurality of display devices such as a rear display and an electronic viewfinder (EVF).

An operation unit 115 is configured with operation members such as buttons and levers, and includes a still image shooting button for instructing shooting of a still image. Note that the operation unit 115 may not be provided with an operation member, and may be configured such that various instructions are input through a touch panel. The user can shoot images by controlling the CPU 110 through the operation unit 115.

When the CPU 110 detects that the user has pressed the still image shooting button, the CPU 110 controls to shoot a still image after a certain period of time including a still image shooting preparation period has elapsed. Further, when the still image shooting button is continuously pressed after the shooting of a still image is started, continuous shooting of the still images is performed. It should be noted that detailed operations relating to still image shooting will be described with reference to the timing chart of FIG. 4.

A recording medium 116 is configured to be removable, and still image data and moving image data are recorded on it. A read only memory (ROM) 117 stores a program for the CPU 110 to control the operation of each unit.

A shutter drive circuit 118 drives and controls the focal plane shutter 105. A focus drive circuit 119 controls the focus actuator 120 based on the output of the CPU 110 to drive the focus lenses (second lens 102, third lens 103) forward and backward in the optical axis direction to perform focus adjustment. A diaphragm drive circuit 121 controls a diaphragm actuator 122 to control the aperture of the diaphragm 101.

Next, the configuration of the image sensor 107 of this embodiment will be described with reference to FIGS. 2A and 2B.

FIG. 2A is a diagram illustrating a detailed circuit configuration of a pixel 206 of the image sensor 107. A photodiode (PD) 200 photoelectrically converts incident light and accumulates the generated electric charge. A transfer switch 201 transfers the electric charge accumulated in the PD 200 to a floating diffusion portion (FD) 202 while a control signal φtx is set to High (hereinafter referred to as "H").

A reset switch 203 is a switch for resetting the FD 202, and is controlled by a signal φres. The pixel reset operation is realized by setting the signal φtx and the signal φres to H at the same time to set the PD 200 and the FD 202 to the power supply voltage (VDD). A pixel amplifier transistor 204 is connected to a constant current source 209 via a selection switch 205 and a vertical output line 208 described later. When a control signal φsel of the selection switch 205 becomes H, the pixel amplifier transistor 204 is connected to the vertical output line 208. Then, the charge transferred from the PD 200 to the FD 202 is converted into a voltage value corresponding to the amount of the charge and output to the vertical output line 208 as an image signal.

Next, the circuit configuration of the image sensor 107 will be described with reference to FIG. 2B.

In a pixel array 207, a plurality of the pixels 206, (m+1) pixels in the horizontal direction and (n+1) pixels in the vertical direction, are arranged in a matrix. Note that both m and n are natural numbers. A drive pulse generation circuit 210 generates pulse signals to be used for a reset operation and a read operation of the pixels 206 based on the synchronization signals from the timing pulse generation circuit 111.

The generated pulse signals are supplied to a pixel drive circuit 212. A row selection circuit 211 selects a row to which the pulse signals generated by the drive pulse generation circuit 210 are to be supplied, and sets the selected row in the pixel drive circuit 212. The pixel drive circuit 212 supplies the pulse signals generated by the drive pulse generation circuit 210 to the row set by the row selection circuit 211 as the control signals described above.

Image signals are output to the vertical output lines 208 from the pixels in the selected row in accordance with the control signals supplied from the pixel drive circuit 212. The constant current source 209 forms a source follower circuit in combination with the pixel amplifier transistor 204.

AD conversion circuits (ADC) 213 convert the analog image signals output to the vertical output lines 208 into digital values corresponding to the signal levels of the analog image signals. The image signals converted into digital values by the ADCs 213 are sequentially selected by a horizontal scanning circuit 214 and transferred to an output terminal 215 that outputs the image signals to outside of the image sensor 107.

By changing the driving of the pixel array 207 by the row selection circuit 211, the image signals can be read out in a plurality of different ways. For example, in the present embodiment, as a readout method for generating a still image, after the image signals are read out from the pixels in the uppermost row, the image signals are read out from the pixels in the next row, and reading out of the image signals from the pixels in the next row is repeated until the image signals are read out from the pixels in the lowermost row.

In addition, as a readout method for generating a moving image, for example, after the image signals are read out from the pixels in the uppermost row, reading out of the image signals from the pixels in every plural rows (for example, two rows) is repeated until the image signals are read out from the pixels in the lowermost row. By reading out the image signals in this way in generating a moving image, although the vertical resolution of the image deteriorates, the image signals of one frame can be read out in a short time and with low power consumption. Other than the above, the image signals can be read out using various readout methods.

Note that, in the present embodiment, an example in which the pixel drive circuit 212 and the ADCs 213 are built in the image sensor 107 has been described, but these circuits may be provided in a chip different from the image sensor 107.

Figure 3:
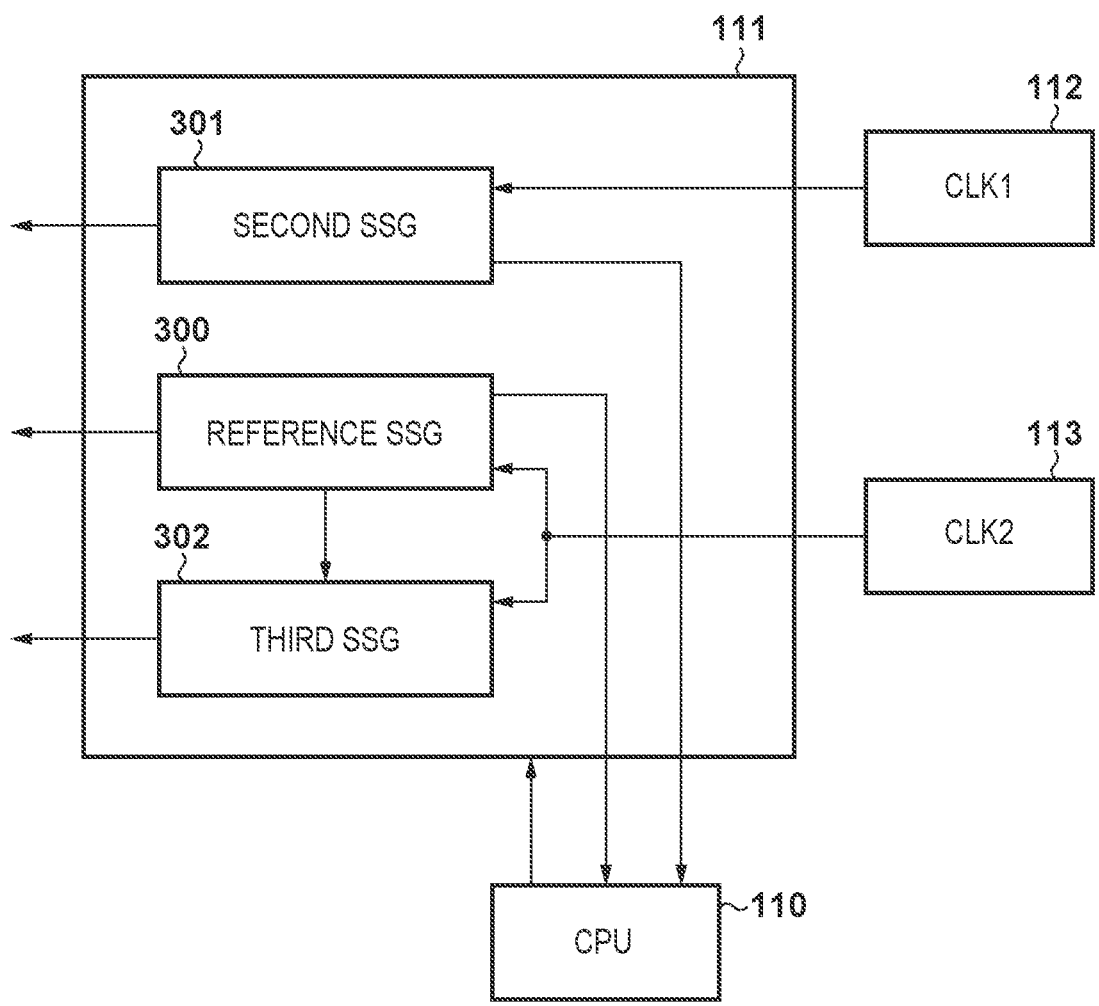
FIG. 3 is a block diagram of a timing pulse generation circuit according to the embodiments.

Next, the internal configuration of the timing pulse generation circuit 111 will be described with reference to FIG. 3. In the present embodiment, the timing pulse generation circuit 111 includes a reference synchronization signal generation circuit 300 (hereinafter referred to as "reference SSG"), a second synchronization signal generation circuit 301 (hereinafter referred to as "second SSG"), and a third synchronization signal generation circuit 302 (hereinafter referred to as "third SSG").

The reference SSG 300 and the second SSG 301 are connected to the CPU 110 and can record the time of assertion timing of each synchronization signal. From this time, the time difference between the assertion timings of the reference SSG 300 and the second SSG 301 can be calculated. In addition, by controlling each of these circuits from the CPU 110, it is possible to generate synchronization signals of various cycles and change the generation timings of the synchronization signals.

Further, in this configuration, the second SSG 301 operates based on the clock signal CLK1 from the first clock 112, and the reference SSG 300 and the third SSG 302 operate based on the clock signal CLK2 from the second clock 113. Then, the second SSG 301 basically generates a second synchronization signal in a predetermined first cycle and outputs it to the image sensor 107, and the third SSG 302 generates a third synchronization signal in the same first cycle and outputs it to the display 114.

In this embodiment, a configuration in which a plurality of clocks are input to the timing pulse generation circuit 111 to generate two types of synchronization signals is described, however the present invention is not limited to this. All SSGs may operate on the basis of a single clock signal or may operate on the basis of different clock signals. In addition, all or part of the above SSGs may independently form a block.

Figure 4:
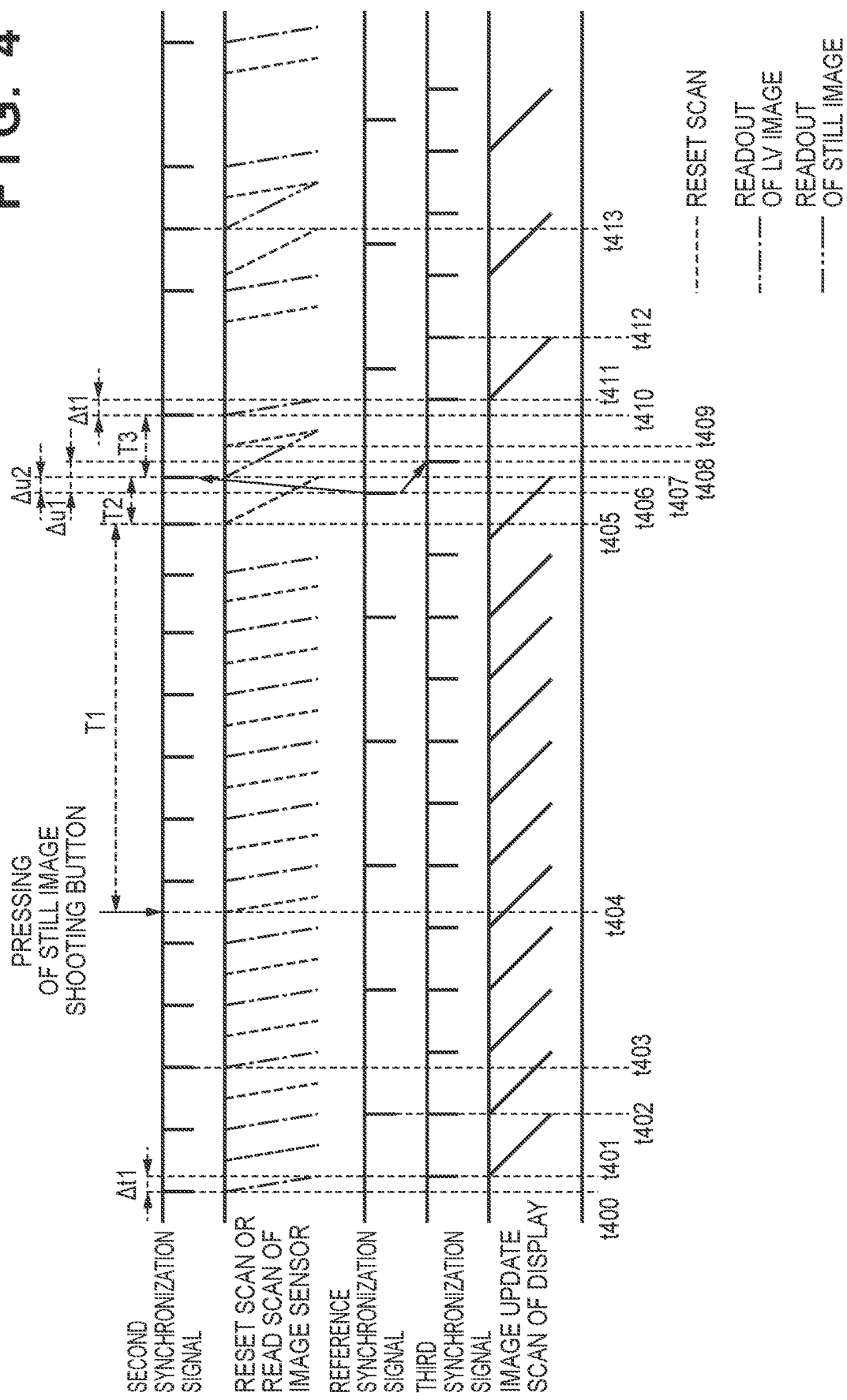
FIG. 4 is a timing chart showing an operation during continuous shooting of still images according to a first embodiment.

FIG. 4 is a timing chart showing a still image shooting operation in the first embodiment, and a case of performing continuous shooting will be described here. In the present embodiment, a still image to be recorded and an LV image to be used for LV display are read out by different reading methods. In FIG. 4, in the "reset scan or read scan of image sensor", the dot-dash lines represent image signal readout for LV image generation, and the two-dot-dash lines represent image signal readout for still image generation. Each broken line represents reset scan corresponding to each reading, and the vertical direction corresponds to the rows of the image sensor 107 in the scanning direction. Further, in FIG. 4, in "image update scan of display", a diagonal solid line represents a scan in which the display 114 updates the LV display, and a vertical direction corresponds to rows of the display 114 in the scanning direction.

When the second synchronization signal is asserted at time t400, the image signal readout for LV image generation is started. Then, when the third synchronization signal is asserted at time t401, the LV image generated based on the image signal whose reading has started at time t400 starts being displayed on the display 114. Here, it is assumed that the captured image can be stably displayed by providing a time lag Δt1, which is the time difference between time t400 and time t401, from the shooting to the display.

Thereafter, the image signal is read out from the image sensor each time the second synchronization signal is asserted, and the LV display is updated each time the third synchronization signal is asserted. Prior to the image signal readout for LV image generation, reset scan is performed at a timing before the timing at which the second synchronization signal is asserted by a predetermined exposure period. The timing of reset scan can be determined from the cycle of the second synchronization signal and the exposure period.

Also, the third SSG 302 resets the value of an internal counter at timings, as time t402, at which the reference synchronization signal is asserted. In this way, the third SSG 302 is synchronized with the synchronization signal from the reference SSG 300. Further, the reference synchronization signal is also input to the CPU 110, and when the CPU 110 detects that the reference synchronization signal is asserted, the CPU 110 reads the value from a counter representing the system time of the CPU 110 and records the count value.

At time t403, which is the timing at which the second synchronization signal is asserted immediately after the reference synchronization signal is asserted at time t402, the image signal readout for LV image generation is started, and at the same time, the second synchronization signal is input to the CPU 110. Then, the CPU 110 records the count value representing the system time when the second synchronization signal is asserted.

The CPU 110 calculates the assertion timing of the second synchronization signal from the count values of the reference synchronization signal and the second synchronization signal by the calculation described later. Then, based on the calculation result, the timing pulse generation circuit 111 is controlled so that the second synchronization signal is asserted at timings when a fixed time has elapsed since the reference synchronization signal is asserted. With this control, both the second synchronization signal and the third synchronization signal can be operated based on the reference synchronization signal, so that the time gap $\Delta t1$ between the second synchronization signal and the third synchronization signal can be maintained at a constant value.

When the still image shooting button is pressed at time t404 and start of shooting is instructed, the operation of the timer for managing the release time lag starts, and at the same time, preparation for shooting a still image such as focus adjustment and exposure control is performed. Then, the second synchronization signal is asserted at time t405 when a release time lag T1, which is longer than the time required for the shooting preparation, has elapsed, and the reset scan for the still image is started. Then, when the charge accumulation period T2 has elapsed, at time t407, the second synchronization signal is asserted again, and the scanning for the image signal readout for still image generation is started. At this time, the phase of the second synchronization signal changes.

Subsequently, at time t409, reset scan for the LV image is started, and at time t410, scanning for the image signal readout for LV image generation corresponding thereto is started. Here, time t410, which is the start timing of the image signal readout for LV image generation, can be calculated from the pressing timing of the still image shooting button, the release time lag T1, the charge accumulation period T2 of the still image, and a period of the image signal readout for still image generation.

Here, a period T3 corresponds to the image update cycle of the display 114, that is, the first cycle. In the present embodiment, these periods T1, T2, and T3 can be settled at the timing when the shooting button is pressed at time t404. Under such a condition, at time t404, the time of assertion timing t406 of the reference synchronization signal and the time of assertion timing t410 of the second synchronization signal for reading the image signal for LV image generation are fixed.

Thus, the assertion timing of the third synchronization signal is changed at time t408 so that the third synchronization signal is to be asserted at time t411 when the time difference becomes $\Delta t1$ from time t410, and the assertion timing is maintained thereafter. In order to realize this, the third synchronization signal is shifted with respect to the reference synchronization signal. Here, the shift amount is adjusted to be equal to or less than the period of the third synchronization signal.

The difference between time t406 when the reference synchronization signal is asserted and time t411 is equal to or more than the period of the third synchronization signal. Therefore, the assertion timings of the third synchronization signal is shifted from the reference synchronization signal at time t408, and the shift amount is defined as $\Delta u1$. and the shift amount is defined as $\Delta u1$. At this time, at time t404, the CPU 110 calculates the time difference $\Delta u1$, and sets the timing pulse generation circuit 111 so that the assertion timing of the third synchronization signal is shifted by $\Delta u1$.

Based on this setting, the third synchronization signal is asserted at time t408. As a result, the third SSG 302 is set to reset the counter value when $\Delta u1$ has elapsed since the third SSG 302 has received the reference synchronization signal.

After that, the third synchronization signal are asserted at timings delayed from the reference synchronization signals by the time difference $\Delta u1$.

Also, the time difference T3 between time t410 at which the second synchronization signal for the image signal readout for LV image generation is asserted and time t407 at which the second synchronization signal for reading the still image is asserted immediately before time t410 is the same as the image update cycle of the display 114. Therefore, after time t407, the control is performed such that the time difference between the assertion timing of the reference synchronization signal and the assertion timing of the second synchronization signal keeps the difference $\Delta u2$ which is the time difference between time t406 at which the reference synchronization signal is asserted and time t407 at which the second synchronization signal for the image signal readout for still image generation is asserted.

More specifically, the difference $\Delta u2$ between time t406 at which the reference synchronization signal is asserted and time t407 at which the second synchronization signal for the image signal readout for still image generation is asserted is recorded as the time difference target value. Thereafter, at a timing after the reference synchronization signal and the second synchronization signal are asserted, the time difference between the assertion timings is calculated, and the time difference target value $\Delta u2$ is subtracted from the calculated time difference. As a result, the difference is a value with which the assertion timing of the second synchronization signal is to be corrected, and therefore the assertion timing of the second synchronization signal is shifted so as to correct the difference.

By operating in this way, after time t407, the second synchronization signal can be asserted at a fixed cycle based on the reference synchronization signal with a phase difference corresponding to the time difference target value $\Delta u2$. By doing so, after time t407, the reference synchronization signal, the second synchronization signal, and the third synchronization signal operate with reference to each other. As a result, it is possible to perform image shooting while keeping the constant time difference $\Delta t1$ between start time t410 of the image signal readout for LV image generation and start time t411 of the image update scan of the display 114.

In this way, by changing the assertion timings of the second synchronization signal and the third synchronization signal, the phase shifts and one frame period having a different cycle is inserted in each of the second synchronization signal and the third synchronization signal. As a result, the phase shift amount of the update timing of the LV image in the display 114, which starts at time t411, from the reference synchronization signal is changed from that of the immediately preceding update timing of the LV image in the display 114, but thereafter, the display time lag of the LV image can be maintained to the time difference $\Delta t1$.

In addition, the reset scan is performed based on the second synchronization signal when the first still image is shot. Whereas, when shooting the second and subsequent still images, the timing of the image signal readout for still image generation is adjusted to the first cycle of the second synchronization signal, and the reset scan is controlled so as to start at a timing before the timing of the image signal readout for still image generation by the required charge accumulation period. As a result, it is possible to eliminate the need to reset the assertion timings of the second synchronization signal and the third synchronization signal.

In the present embodiment, the read image signal for still image generation is not used for LV display on the display 114, and there is the following reason for this. In general, the optimum period of time for displaying a still image since it is captured (referred to as Δt2) is different from that for displaying an LV image since it is captured (Δt1 in the present embodiment). Therefore, when trying to display a still image on the display 114, since the display time lag is different from that for displaying the frames of the LV image, it is considered that the movement of the subject becomes unnatural. However, it may be configured to display a still image.

Further, in the present embodiment, the image signal readout for LV image generation at the update timing of the display 114 at time t412 is not performed. The reason for this is that at timings at which the image signal readout for still image generation (for example, the readout which starts at time t413) is performed in continuous shooting, the image signal readout for LV image generation cannot be performed. This is also for maintaining a constant LV image update rate during continuous shooting of still images. At this time, the second SSG 301 controls to thin out the second synchronization signal. However, if the read speed of the image signal from the image sensor 107 is sufficiently high, the update rate of the LV image may be increased and the LV image may be updated at that update rate.

Further, in the present embodiment, the frame rate of the display 114 is reduced during continuous shooting of still images, however the present invention is not limited to this. If the read speed of the image signal is sufficiently high as described above, the update rate of the display 114 during the continuous shooting of the still image is performed and the update rate of the display during the continuous shooting of the still image is not performed may be controlled to be the same by halving the cycle of the second synchronization signal in FIG. 4, for example. In this way, if the read method of the image signal for the still image generation and the read method of the image signal for LV image generation are different, it is possible to prevent the update rate of the display 114 from being reduced during continuous shooting.

As described above, according to the first embodiment, it is possible to prevent the display time lag of the LV image from changing even during continuous shooting of the still images, which realizes a better live view display.

Although the LV image is used only for display in the present embodiment, it is also possible to record the LV image in the recording medium 116 as a moving image. With this configuration, it becomes possible to capture a still image and a moving image at the same time.

First Modification

Figure 5:
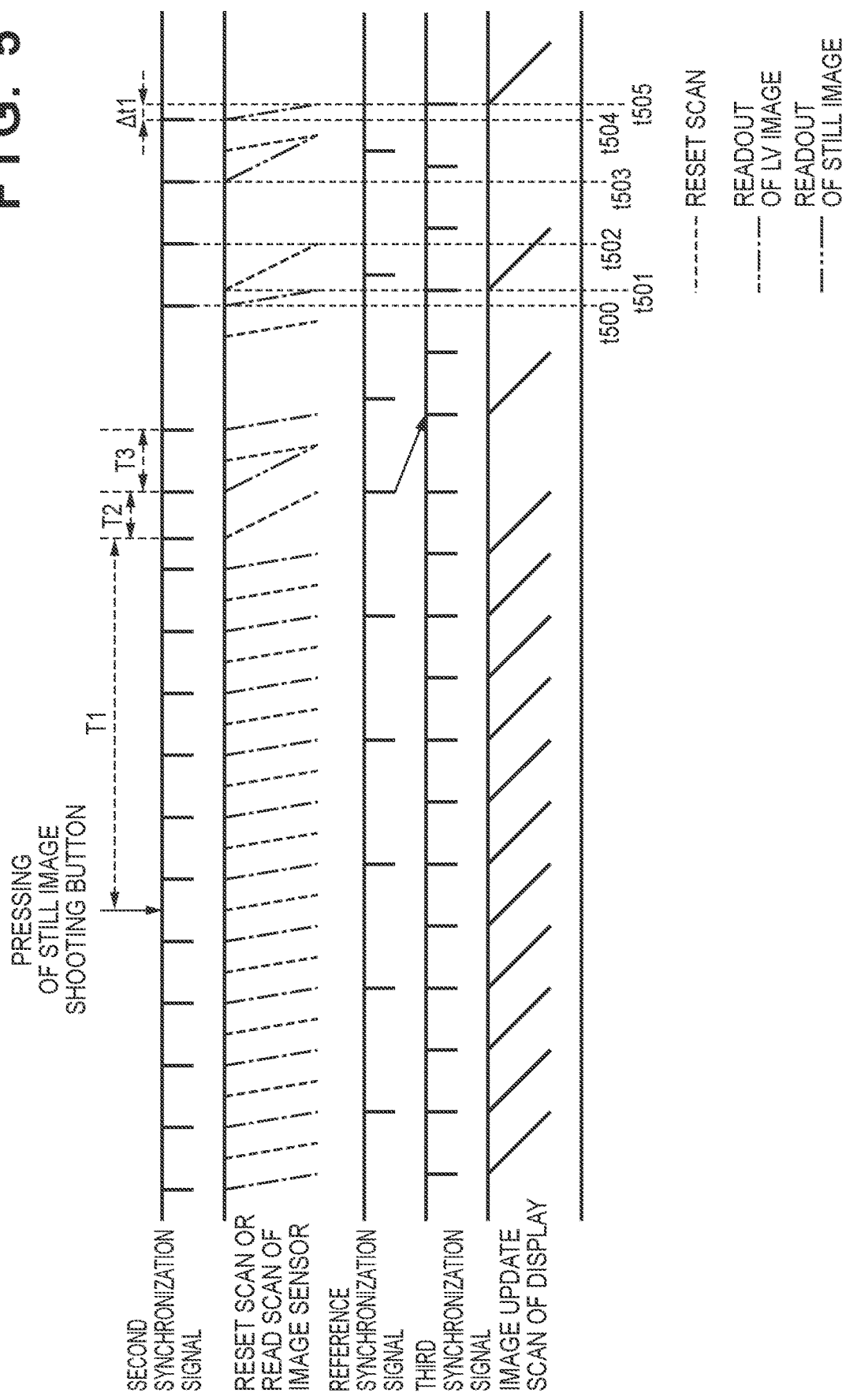
FIG. 5 is a timing chart showing an operation during continuous shooting of still images according to a first modification.

FIG. 5 shows a timing chart in a case where the charge accumulation period in the second frame shooting during continuous shooting of still images is longer than the update rate of the LV display. Examples of the cases where the length of the charge accumulation period changes during continuous shooting of still images include a case where the photometric value measured for each still image changes and a case where the exposure bracket shooting is performed.

As shown in FIG. 5, in a case where the charge accumulation period of a still image is longer than the update rate of the display 114, no matter what value the charge accumulation period of the still image is, the interval between the read timings of image signals for LV image generation and image signals for still image generation is controlled to be an integral multiple of the first cycle. By controlling in this way, it is possible to make readjusting of the timing of updating the LV image on the display 114 unnecessary. Here, the specific control method thereof will be described with reference to the timing chart in FIG. 5. Note that description of the timings already described with reference to the timing chart in FIG. 4 will be omitted.

After capturing the first still image, the reset scan for the still image is started at time t501 when a predetermined time has elapsed since the second synchronization signal is asserted at time t500. Further, as described above, the charge accumulation period of the second still image is longer than the period from time t500 to time t502, that is, the first cycle. It is assumed that the charge accumulation period is determined by the time when reset scan starts.

First, time t503, that is the assertion timing of the second synchronization signal immediately after the lapse of the charge accumulation period since the reading of the image signal for LV image generation is started at time t500, is determined as start timing of reading the image signal for second still image generation. Then, time t501 is determined by counting backward from time t503 by the charge accumulation period. In the example of the timing chart shown in FIG. 5, the LV image is not read out at the timing when the second synchronization signal is asserted at time t502.

At time t503, the image signal for still image generation corresponding to the reset scan started at time t501 is read out, and then the image signal for LV image generation is read at the timing at which the second synchronization signal is asserted at time t504. In this way, since it is possible to maintain the relationship of the time difference Δt1 between the read timing of the image signal for LV image generation at time t504 and the update timing of the display 114 at time t505, it is possible to control the display time lag to be maintained at time difference Δt1 shown in the timing chart of FIG. 4.

As described above, according to the first modification, the charge accumulation period of a still image can be controlled without frequently adjusting the assertion timings of the reference synchronization signal and the third synchronization signal.

Second Modification

In the timing chart of FIG. 4, when the still image shooting button is pressed at time t404, the release time lag T1, the charge accumulation period T2 of a still image, and the read out time T3 of the image signal for still image generation are determined. However, there are actually other cases as well.

Figure 6:
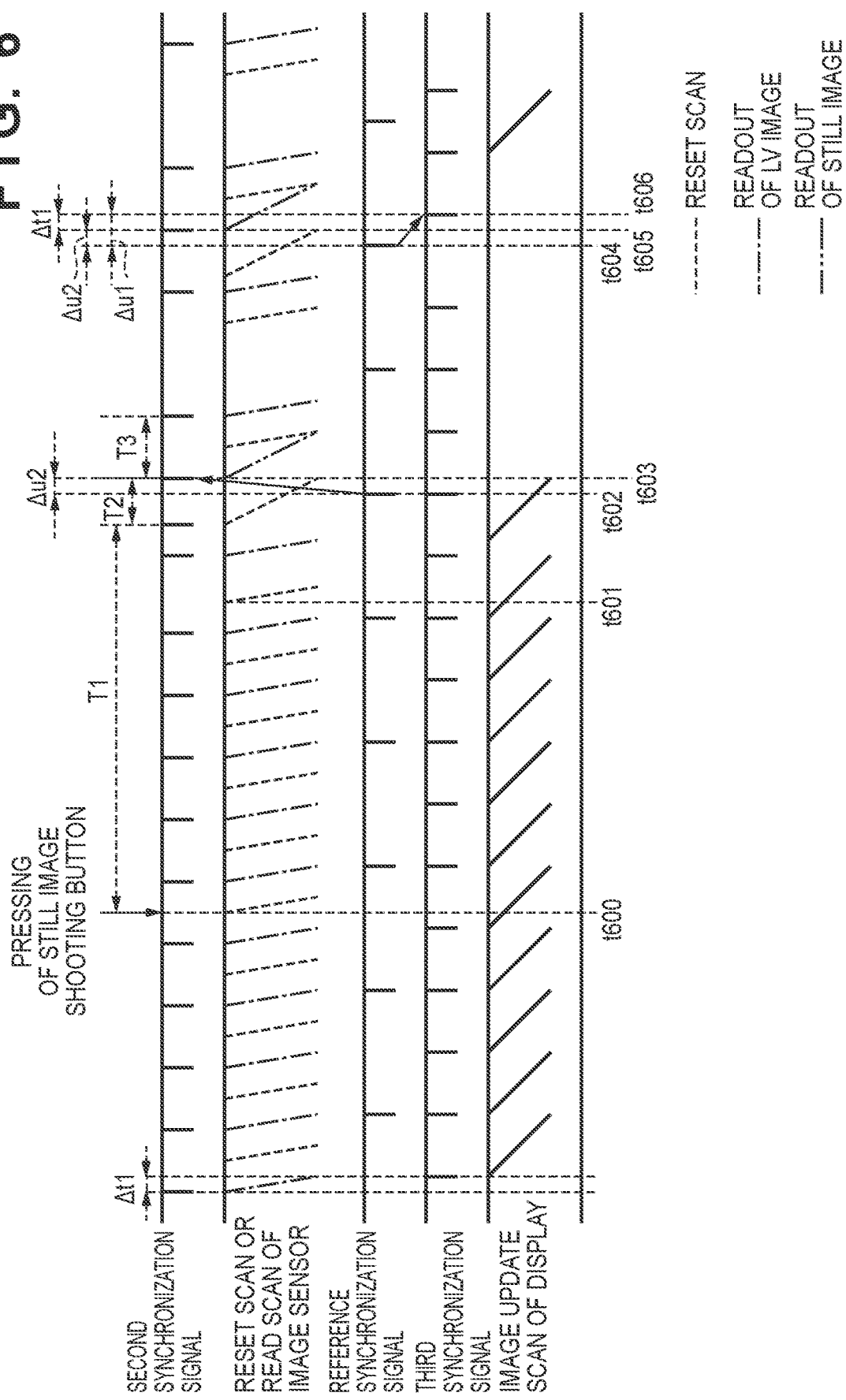
FIG. 6 is a timing chart showing an operation during continuous shooting of still images according to a second modification.

For example, the charge accumulation period may be determined as part of the exposure control during the shooting preparation in the release time lag T1. In this case, when the still image shooting button is pressed at time t600 in FIG. 6, the charge accumulation period T2 of the still image is not fixed, and the timing adjustment as described in the timing chart of FIG. 4 cannot be performed. Therefore, in the second modification, a case where the charge accumulation period T2 is determined at time t601 will be described.

The reference synchronization signal is asserted at time t602, and the second synchronization signal is asserted at time t603. At this time, the assertion timing of the second synchronization signal is controlled by the method described with reference to the timing chart of FIG. 4. However, if it takes time to change the assertion timing of the third synchronization signal, the control of the assertion timing of the third synchronization signal cannot be performed by the method described with reference to the timing chart of FIG. 4.

In such a case, the image update scan of the display 114 is stopped for a while and started at a timing when the assertion timing of the next synchronization signal can be controlled. For example, focusing on the times before and after the timing at which the still image shooting is performed next time, the reference synchronization signal is asserted at time t604, and then the second synchronization signal is asserted at time t605. The assertion timing of the second synchronization signal is controlled so as to maintain a time difference $\Delta u2$ from the assertion timing t604 of the reference synchronization signal as described above.

At this time, it should be set so that the third synchronization signal is asserted at time t606 when time $\Delta t1$ has elapsed since the second synchronization signal is asserted at time t605. In order to realize this, the time difference $\Delta u1$ between the assertion timings of the reference synchronization signal and the third synchronization signal at time t606 may be calculated and set to the timing pulse generation circuit 111. This time difference $\Delta u1$ can be calculated when the charge accumulation time T2 is fixed at time t601.

Therefore, at time t601, the CPU 110 calculates the time difference $\Delta u1$, and sets the timing pulse generation circuit 111 so that the assertion timing of the third synchronization signal is shifted by the time difference $\Delta u1$. Based on this setting, the third synchronization signal is asserted at time t606. At this time, the third SSG 302 is set to reset the counter value when $\Delta u1$ has elapsed since the SSG 302 received the reference synchronization signal.

Second Embodiment

Next, a second embodiment of the present invention will be described.

In the first embodiment, in order to reduce power consumption, the readout of the image signal for still image generation and the readout of the image signal for LV image generation are performed by different readout methods. However, this not only complicates the processing, but also causes a decrease in the display frame rate. Therefore, in the second embodiment, a method of suppressing a decrease in the display frame rate by using the read image signal for still image generation for LV display during continuous shooting of still images will be described.

Figure 7:
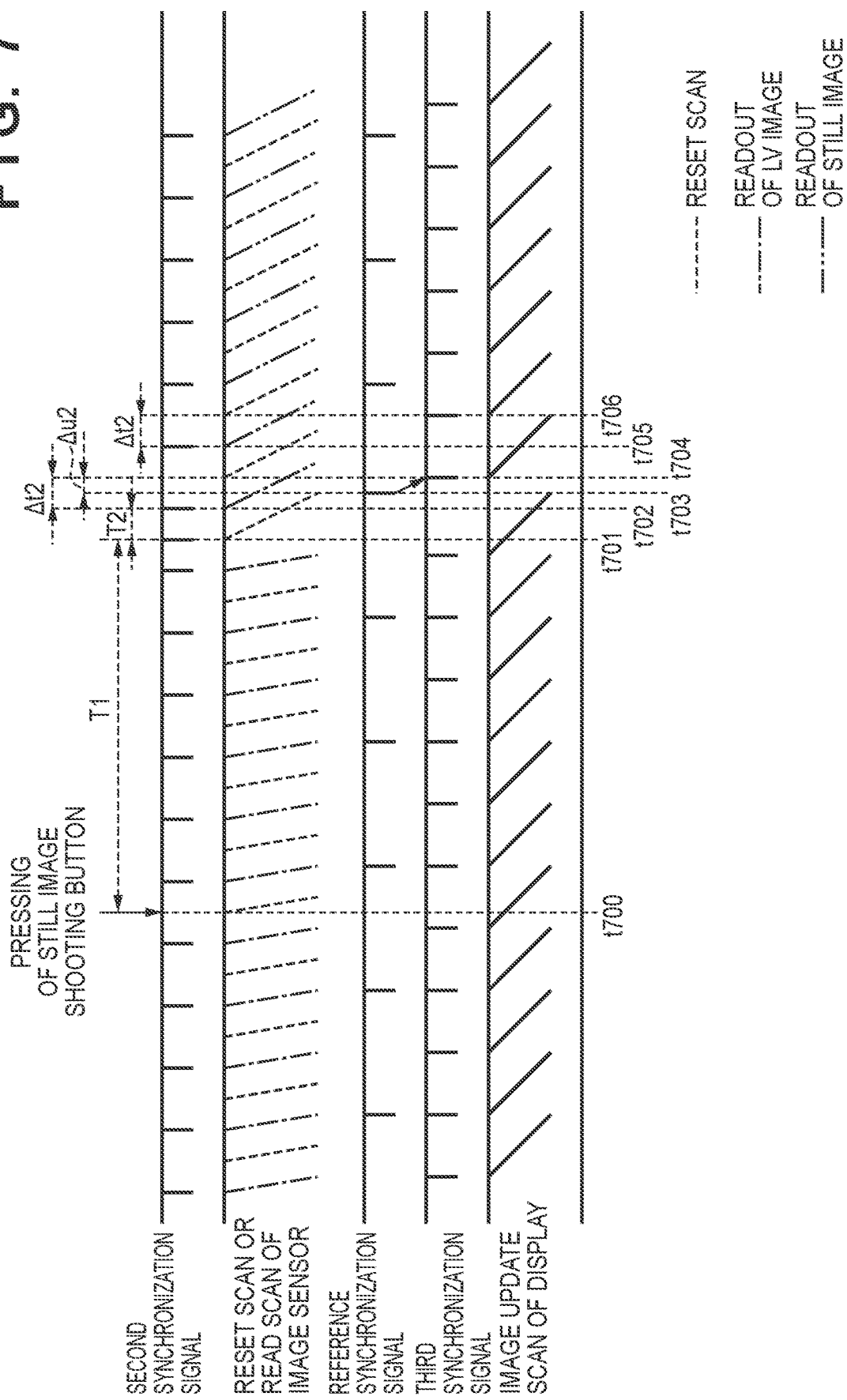
FIG. 7 is a timing chart showing an operation during continuous shooting of still images according to a second embodiment.

FIG. 7 is a timing chart showing a still image shooting operation in the second embodiment. The readout method of the LV image before pressing the still image shooting button may be or may not be the same as the readout method of the still image, however, from the viewpoint of the time difference from readout to display and of saving the power consumption, the readout method of the LV image is different from that of the still image. Note that, in FIG. 7, the lines of various types indicate the same things as those described in the first embodiment with reference to FIG. 4, and therefore the description thereof is omitted here. Further, the operation before the still image shooting button is pressed is the same as that shown in the timing chart of FIG. 4, and the description thereof is also omitted.

When the still image shooting button is pressed at time t700, preparation for shooting a still image such as focus adjustment and exposure control is performed. Then, at time t701 when the release time lag T1 has elapsed, the second synchronization signal is asserted, and the reset scan for the still image is started. When the predetermined charge accumulation time T2 has elapsed, at time t702, the second synchronization signal is asserted again, and the readout scan of the image signal for still image generation is started. After that, the second synchronization signal is asserted at the same first cycle as before the still image shooting.

In the present embodiment, the shot still image is displayed on the display 114. Here, let the most suitable time difference for displaying the read still image on the display 114 be $\Delta t2$. At this time, the time from the assertion timing t702 of the second synchronization signal to the assertion timing t704 of the third synchronization signal immediately thereafter is controlled to be $\Delta t2$.

More specifically, at time t700 when the still image shooting button is pressed, the release time lag T1 and the charge accumulation period T2 are fixed, so time t702 when the readout of the image signal for still image generation is started is determined. Therefore, time t704 when the time difference $\Delta t2$ has elapsed since time t702 can be simultaneously determined at that time. In order to assert the third synchronization signal at that time using these pieces of information, the assertion timing of the third synchronization signal may be changed by a time difference $\Delta u2$ from t703 when the reference synchronization signal is asserted.

The CPU 110 performs a calculation for obtaining the time difference $\Delta u2$, and changes the setting of the timing pulse generation circuit 111 at time t700. Then, the assertion timing of the third synchronization signal is changed from time t703 to time t704, which is changed by the time difference $\Delta u2$.

As the still image shooting button is still being pressed, so the image signal for the second still image generation is read out at time t705, when the time equal to the cycle of the update rate of the display 114 has elapsed from time t702 when the first still image is shot. Then, the read image is used as the LV image on the display 114, which is updated at time t706 when a time difference $\Delta t2$ has elapsed from time t705.

By controlling various timings as described above, continuous shooting of still images can be performed without lowering the display rate of the display 114 even during the continuous shooting.

In the present embodiment, the shooting cycle of the still images and the update cycle of the display 114 are controlled to be the same. However, such control is not always necessary, and the shooting cycle of the still images may be a fraction of an integer of the update cycle of the display 114. By controlling in this way, it is possible to set the cycle of the continuous shooting of still images beyond the update rate of the display 114.

On the contrary, it is not necessary to record all the captured still images. In order to reduce power consumption and processing load, not all captured still images may be recorded, and the captured still images may be thinned out and recorded.

Further, even when various calculations for automatic exposure (AE) and automatic focus adjustment (AF) are performed using the read image signal for still image generation, similarly to the recording, the calculations may not be performed for all captured still images, and the captured still images may be thinned out and subjected to the calculations.

Third Embodiment

Next, a third embodiment of the present invention will be described.

Figure 8:
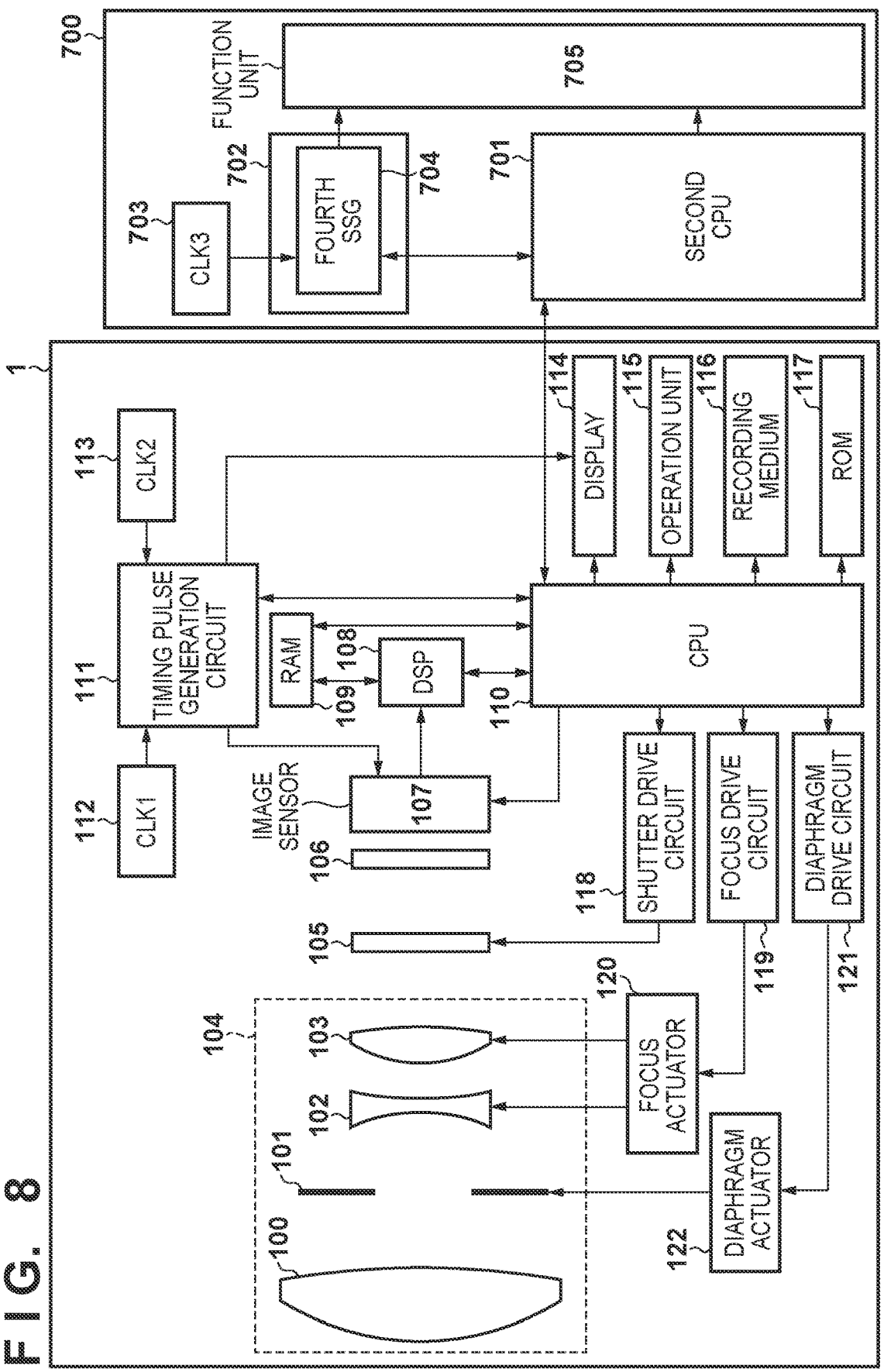
FIG. 8 is a block diagram showing a configuration of an image capturing system according to a third embodiment.

FIG. 8 is a block diagram showing the configuration of an image capturing system according to the third embodiment.

The same components as those shown in FIG. 1 are designated by the same reference numerals and the description thereof will be omitted. In this embodiment, by connecting an external device 700 to the image capturing apparatus 1 having the configuration shown in FIG. 1, the image capturing apparatus 1 and the external device 700 can operate integrally. In the present embodiment, an example will be described in which, of such configurations, a synchronization signal is input to the external device 700 to maintain synchronization between the external device 700 and the image capturing apparatus 1.

A second CPU 701 is built in the external device 700, and the second CPU 701 and the CPU 110 are connected and exchange information via communication. The second CPU 701 performs settings on a second timing pulse generation circuit 702 which operates based on a third clock signal CLK3 output from a third clock 703. The second timing pulse generation circuit 702 receives the reference synchronization signal output from the timing pulse generation circuit 111. The second timing pulse generation circuit 702 incorporates a fourth synchronization signal generation circuit 704 (hereinafter, referred to as "fourth SSG"). Then, the reference synchronization signal output from the timing pulse generation circuit 111 and the third clock signal CLK3 output from the third clock 703 are input to the fourth SSG 704.

Similarly to the third SSG 302, the fourth SSG 704 has a function of, when a reference synchronization signal output from the timing pulse generation circuit 111 is received, resetting a counter after a predetermined time has elapsed since the reception of the reference synchronization signal. The predetermined time here includes 0. Therefore, the assertion timing of a fourth synchronization signal from the fourth SSG 704 can be changed in exactly the same manner as the method of changing the assertion timing of the third synchronization signal described with reference to the timing chart of FIG. 4 in the first embodiment. By using the function, the external device 700 can operate so as to be synchronized with the shooting of the LV image even during the continuous shooting of still images.

A function unit 705 operates based on the timing pulse from the second timing pulse generation circuit 702 and the setting by the second CPU 701. Here, the function of the function unit 705 is not limited to a specific function. For example, various devices such as a time recorder for recording operating time, a microphone for recording voice, a lighting device for adjusting light amount, a recording device for recording video, a display device for displaying a shot image, and the like, are conceivable. Devices other than these may be used. In addition, in order to realize various functions, the function unit 705 may be divided into several blocks.

As described above, according to the third embodiment, by controlling the fourth SSG 704 incorporated in the external device 700 connected to the image capturing apparatus 1, the operation timing of the external device is 700 can be steadily controlled with respect to the timing at which an image is captured. By operating the external device in this way, it is possible to change the operation timing of the external device so that the operation timing of the external device is optimal with respect to the timing at which the image is acquired.

Fourth Embodiment

Next, a fourth embodiment of the present invention will be described.

Figure 9:
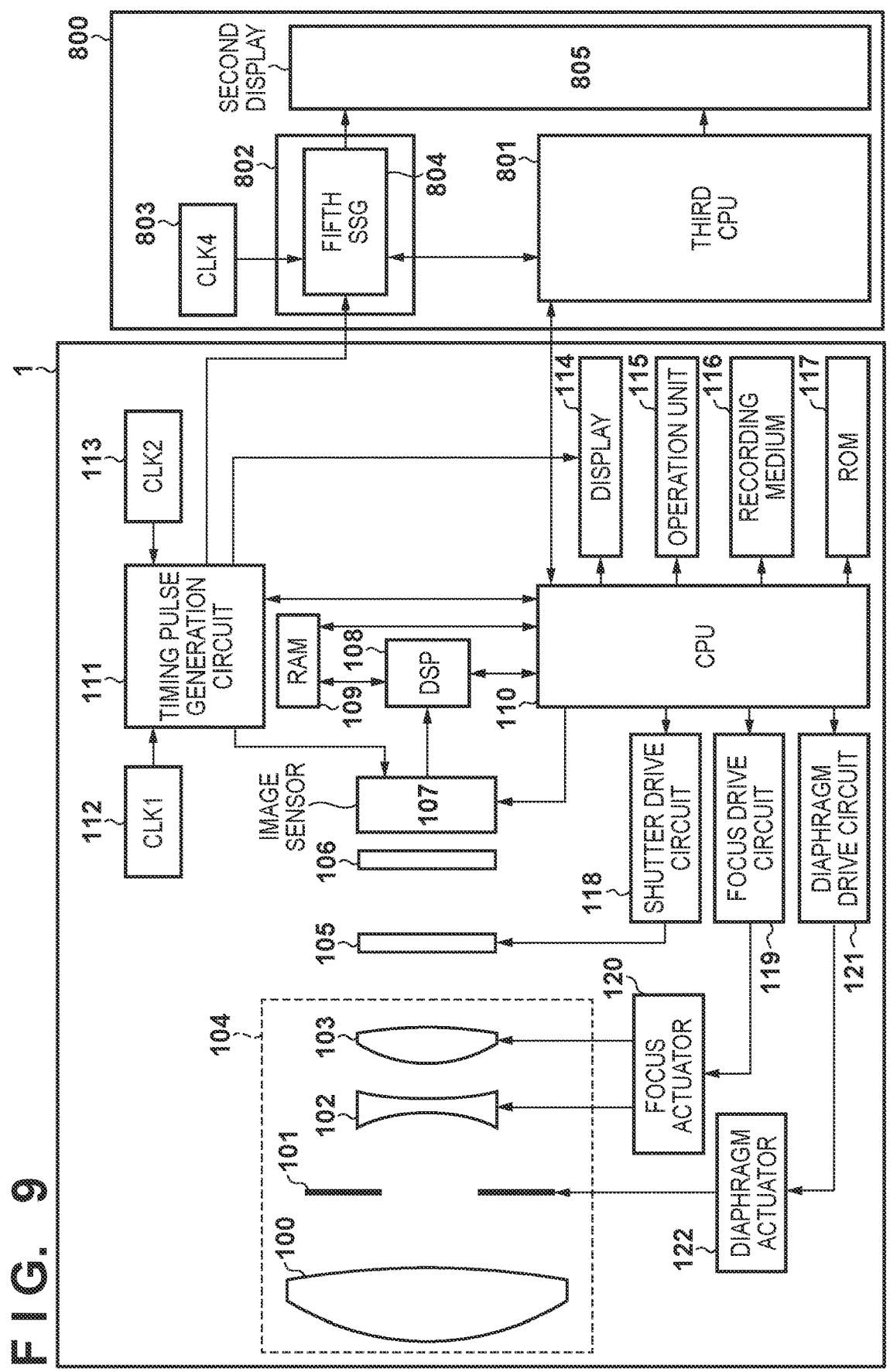
FIG. 9 is a block diagram showing a configuration of an image capturing system according to a fourth embodiment.

FIG. 9 is a block diagram showing the configuration of the image capturing system according to the fourth embodiment. The same components as those shown in FIG. 1 are designated by the same reference numerals and the description thereof will be omitted. In the present embodiment, by connecting an external display device 800 to the image capturing apparatus 1 having the configuration shown in FIG. 1, the image capturing apparatus 1 and the external display device 800 can operate integrally. In the present embodiment, among such integrally operable configurations, an example in which a simpler configuration is realized by not inputting a synchronization signal to the external display device 800 will be shown.

A third CPU 801 is built in the external display device 800, and the third CPU 801 and the CPU 110 are connected and exchange information via communication. The third CPU 801 performs settings on a third timing pulse generation circuit 802 which operates based on a fourth clock signal CLK4 output from a fourth clock 803. The third timing pulse generation circuit 802 incorporates a fifth synchronization signal generation circuit 804 (hereinafter, referred to as "fifth SSG"), and the fourth clock signal CLK4 output from the fourth clock 803 is input to the fifth SSG 804. Since the fifth SSG 804 does not accept the synchronization signal asserted by the reference SSG 300, the timing at which the fifth SSG 804 asserts the synchronization signal and the timing at which the reference SSG 300 asserts the synchronization signal cannot be synchronized.

A second display 805 displays the image read out from the image sensor 107 according to the synchronization signal asserted by the fifth SSG 804 and the settings by the third CPU 801. In such a configuration, since the timing at which the fifth SSG 804 asserts the synchronization signal has nothing to do with the timing at which the still image shooting button is pressed, the timing at which the image is displayed is also nothing to do with the timing at which the still image shooting start instruction is notified.

At this time, although the timing of displaying the image on the external display device 800 is independent of the still image shooting start instruction, the display time lag in the display 114 is reduced by performing the operation described in the first embodiment.

As described above, according to the method described in this embodiment, the number of connection signal lines between the image capturing apparatus 1 and the external display device 800 can be reduced. As a result, it is possible to reduce the display time lag in the viewfinder which is directly viewed by the photographer while displaying an image on the other external monitor or the like with a simple system.

OTHER EMBODIMENTS

The present invention may be applied to a system including a plurality of devices or an apparatus including a single device.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-228616, filed on Dec. 18, 2019 which is hereby incorporated by reference herein in its entirety.

What is claimed is:

1. A control apparatus comprising:
a generation unit that generates a first synchronization signal to be provided to an image sensor for controlling readout timing of an image signal from the image sensor and a second synchronization signal to be provided to a display for controlling timing for displaying an image based on the readout image signal on the display; and
a control unit that controls the generation unit,
wherein the control unit controls the generation unit such that
the first synchronization signal is repeatedly generated so as to read out a first image signal of each frame from the image sensor and the second synchronization signal is repeatedly generated so as to sequentially display images based on the first image signal on the display, the first synchronization signal and the second synchronization signal being generated with a predetermined time difference, and
in a case where a shooting instruction is given by a user's operation and a second image signal is read out from the image sensor at a timing corresponding to the shooting instruction between readouts of the first image signal of frames, the predetermined time difference between the first synchronization signal and the second synchronization signal is maintained before and after the readout of the second image signal by changing the output timings of the first synchronization signal and the second synchronization signal based on a preparation period for acquiring the second image signal and a charge accumulation period for the second image signal, and
wherein each unit is implemented by one or more processors, circuitry or a combination thereof.

2. The control apparatus according to claim 1, wherein the generation unit generates the first synchronization signal and the second synchronization signal based on a reference synchronization signal having a first cycle, and
the control unit instructs to the generation unit a time difference of an output timing of the first synchronization signal from the reference synchronization signal and a time difference of an output timing of the second synchronization signal from the reference synchronization signal.

3. The control apparatus according to claim 1, wherein, in a case where the shooting instruction is not given, the generation unit repeatedly generates the first synchronization signal and the second synchronization signal at a second cycle, and
in a case where the second image signal is repeatedly read out, the control unit controls the generation unit such that second and subsequent readout timings of the second image signal is changed to timings of an integer multiple of the second cycle from the first readout timing of the second image signal.

4. The control apparatus according to claim 1, wherein the generation unit generates the second synchronization signal at a second cycle, and
in a case where the second image signal can be read out within the second cycle, the second image signal is displayed on the display.

5. The control apparatus according to claim 4, wherein the first image signal and the second image signal are read out from the image sensor by a same readout method.

6. The control apparatus according to claim 4, wherein the second image signal is read out from the image sensor by a readout method that takes more time than a readout method used for reading out the first image signal, and
in a case where a shooting instruction is given, the control unit controls the generation unit to shift an output timing of the second synchronization signal so as to have a second time difference which is longer than the time difference during the second image signal is displayed on the display.

7. The control apparatus according to claim 1, wherein the first image signal is an image signal of a moving image.

8. A control apparatus comprising:
a generation unit that generates a first synchronization signal to be provided to an image sensor for controlling readout timing of an image signal from the image sensor and a second synchronization signal to be provided to a display for controlling timing for displaying an image based on the readout image signal on the display; and
a control unit that controls the generation unit,
wherein the control unit controls the generation unit such that
the first synchronization signal is repeatedly generated so as to read out a first image signal of each frame from the image sensor and the second synchronization signal is repeatedly generated so as to sequentially display images based on the first image signal on the display, the first synchronization signal and the second synchronization signal being generated with a predetermined time difference, and
in a case where a shooting instruction is given by a user's operation and accumulation of charges for a second image signal of a frame to be read out from the image sensor is performed at a timing when a predetermined period of time has passed since the shooting instruction was given and between readouts of the first image signal of frames, the first synchronization signal and the second synchronization signal are generated with the predetermined time difference when reading out the first signal after reading out the second image signal by changing the output timings of the first synchronization signal and the second synchronization signal based on the timing when the shooting instruction was given, and wherein each unit is implemented by one or more processors, circuitry or a combination thereof.

9. The control apparatus according to claim 8, wherein the generation unit generates the first synchronization signal and the second synchronization signal based on a reference synchronization signal having a first cycle, and the control unit instructs to the generation unit a time difference of an output timing of the first synchronization signal from the reference synchronization signal and a time difference of an output timing of the second synchronization signal from the reference synchronization signal.

10. The control apparatus according to claim 8, wherein, in a case where the shooting instruction is not given, the generation unit repeatedly generates the first synchronization signal and the second synchronization signal at a second cycle, and in a case where the second image signal is repeatedly read out, the control unit controls the generation unit such that second and subsequent readout timings of the second image signal is changed to timings of an integer multiple of the second cycle from the first readout timing of the second image signal.

11. The control apparatus according to claim 1, wherein the generation unit generates the second synchronization signal at a second cycle, and in a case where the second image signal can be read out within the second cycle, the second image signal is displayed on the display.

12. The control apparatus according to claim 11, wherein the first image signal and the second image signal are read out from the image sensor by a same readout method.

13. The control apparatus according to claim 11, wherein the second image signal is read out from the image sensor by a readout method that takes more time than a readout method used for reading out the first image signal, and in a case where a shooting instruction is given, the control unit controls the generation unit to shift an output timing of the second synchronization signal so as to have a second time difference which is longer than the time difference during the second image signal is displayed on the display.

14. The control apparatus according to claim 8, wherein the first image signal is an image signal of a moving image.

15. An image capturing apparatus including:
an image sensor, and
a control apparatus comprising:
    a generation unit that generates a first synchronization signal to be provided to the image sensor for controlling readout timing of an image signal from the image sensor and a second synchronization signal to be provided to a display for controlling timing for displaying an image based on the readout image signal on the display; and
    a control unit that controls the generation unit,
wherein the control unit controls the generation unit such that
    the first synchronization signal is repeatedly generated so as to read out a first image signal of each frame from the image sensor and the second synchronization signal is repeatedly generated so as to sequentially display images based on the first image signal on the display, the first synchronization signal and the second synchronization signal being generated with a predetermined time difference, and
    in a case where a shooting instruction is given by a user's operation and a second image signal is read out from the image sensor at a timing corresponding to the shooting instruction between readouts of the first image signal of frames, the predetermined time difference between the first synchronization signal and the second synchronization signal is maintained before and after the readout of the second image signal by changing the output timings of the first synchronization signal and the second synchronization signal based on a preparation period for acquiring the second image signal and a charge accumulation period for the second image signal, and
wherein each unit is implemented by one or more processors, circuitry or a combination thereof.

16. An image capturing apparatus including:
an image sensor, and
a control apparatus comprising:
    a generation unit that generates a first synchronization signal to be provided to the image sensor for controlling readout timing of an image signal from the image sensor and a second synchronization signal to be provided to a display for controlling timing for displaying an image based on the readout image signal on the display; and
    a control unit that controls the generation unit,
wherein the control unit controls the generation unit such that
    the first synchronization signal is repeatedly generated so as to read out a first image signal of each frame from the image sensor and the second synchronization signal is repeatedly generated so as to sequentially display images based on the first image signal on the display, the first synchronization signal and the second synchronization signal being generated with a predetermined time difference, and
    in a case where a shooting instruction is given by a user's operation and accumulation of charges for a second image signal of a frame to be read out from the image sensor is performed at a timing when a predetermined period of time has passed since the shooting instruction was given and between readouts of the first image signal of frames, the first synchronization signal and the second synchronization signal are generated with the predetermined time difference when reading out the first signal after reading out the second image signal by changing the output timings of the first synchronization signal and the second synchronization signal based on the timing when the shooting instruction was given, and
wherein each unit is implemented by one or more processors, circuitry or a combination thereof.

* * * * *